H. H. CLARK.
MOTOR CONTROL.
APPLICATION FILED JULY 26, 1906.
912,074.
Patented Feb. 9, 1909.
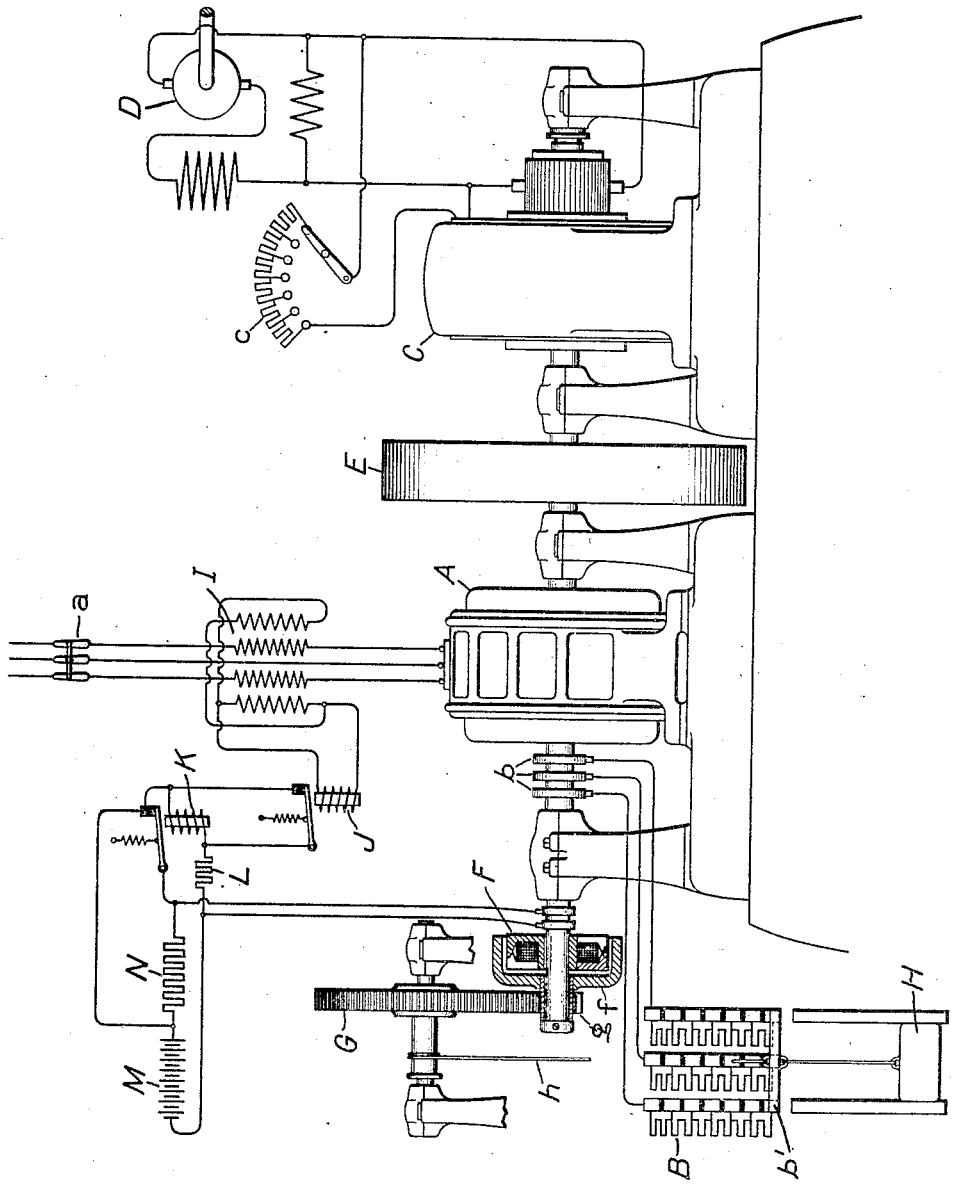
Witnesses:
George H. Tilden.
Inventor:
Harold H. Clark,
by Albert G. Davis,
Att'y.

UNITED STATES PATENT OFFICE.

HAROLD H. CLARK, OF SCHENECTADY, NEW YORK, ASSIGNOR TO GENERAL ELECTRIC COMPANY, A CORPORATION OF NEW YORK.

MOTOR CONTROL.

No. 912,074.      Specification of Letters Patent.      Patented Feb. 9, 1909.

Application filed July 26, 1906. Serial No. 327,914.

*To all whom it may concern:*

Be it known that I, HAROLD H. CLARK, a citizen of the United States, residing at Schenectady, county of Schenectady, State of New York, have invented certain new and useful Improvements in Motor Control, of which the following is a specification.

My invention relates to the control of electric motors driving varying loads, and its object is to provide novel and efficient automatic means for maintaining the electric input to such motors approximately constant.

My invention is particularly applicable to the control of induction motors, but in its broader aspects is not limited to any particular type of motor.

It has been proposed heretofore in the case of motors driving variable loads, such as mine hoists, through either mechanical or electrical transmission devices, to provide the motor with energy-storing means, such as a fly-wheel, and to vary the speed of the motor automatically with varying load, so as to enable the fly-wheel to store up energy during light loads and to give up this energy on heavy loads.

My invention consists in a novel arrangement for controlling the speed of the motor. I provide a resistance or other impedance in circuit with the motor, with a switch member for varying the amount of the resistance, and connect the switch member to a source of mechanical power through a slipping clutch controllable by the amount of motor current. By making and breaking the connection between the switch member and the source of power as the load on the motor varies, the switch member may be moved to cut the resistance into and out of circuit, so as to vary the speed of the motor.

My invention will best be understood by reference to the accompanying drawing, which shows diagrammatically an induction motor provided with automatic controlling apparatus in accordance with my invention.

In the drawing, A represents a three-phase induction motor which is arranged to be connected through the switch $a$ to the supply conductors. The secondary of the motor is provided with collector rings $b$, which are connected to a variable resistance B, the amount of which is controlled by a movable switch member $b^1$. The motor A is connected to a variable load through any suitable transmission mechanism. The transmission mechanism shown in the drawing comprises a direct-current generator C provided with the usual field rheostat $c$ and the electric motor D, the shaft of which is connected to the load to be driven,—such for instance as a mine hoist. I have indicated a shunt generator and compound-wound motor, but it will be understood that the particular type of transmission mechanism employed forms no part of my invention, and may be modified as desired.

E represents a heavy fly-wheel on the shaft of the motor A, which serves to store up energy during periods of light load, and to deliver the stored up energy at times of heavy load. In order that the fly-wheel may act efficiently in this manner, it is essential that the speed of the motor should be varied to some extent as the load varies. By shifting the position of the switch member $b^1$, so as to vary the amount of the resistance B in the secondary circuit of the motor, the slip of the motor may be adjusted, and the desired speed variation obtained. For actuating the switch member $b^1$ automatically, I provide a slipping magnetic clutch F on the shaft of the motor A. This clutch is preferably of the well-known eddy-current type in which the torque is produced by the currents induced in the armature by the rotation of the other clutch member, which is provided with poles. The armature $f$ of this clutch is provided with the pinion $g$ engaging a gear G, the shaft of which carries a drum over which is wound a rope $h$ connected to switch member $b^1$, and provided with a counter-weight H, which tends to hold switch member $b^1$ in its lowest position, as shown in the drawing, and exerts a constant torque on the armature $f$ of the clutch through the rope, gear and pinion. For controlling the circuit of the magnet winding of clutch F, I provide series transformers I controlling a magnet J, which in turn controls a second magnet K, which, in series with a resistance L, is connected to any suitable source of current, indicated by the battery M, which also acts as a source of supply for the clutch winding. A resistance N is inserted in series with the clutch.

The operation is as follows: At starting, the switch $b^1$ is in the position shown, with all the resistance in circuit. When the switch $a$ is closed, admitting current to the induction motor A, a comparatively large starting current flows, which energizes magnet J sufficiently to enable it to draw down its armature, removing the short-circuit from around magnet K. Magnet K consequently draws down its armature, opening the short-circuit around resistance N, and maintaining it open. With resistance N in circuit, clutch magnet F exerts too weak a torque on its armature to rotate it against the pull of weight H. The motor A consequently starts and accelerates with all the resistance in the secondary circuit. During acceleration, energy is stored in the fly-wheel E. When the motor A is up to speed and the primary current consequently diminishes, the magnet J releases its armature, short-circuiting magnet K, which, in turn, releases its armature, closing the short-circuit around resistance N. Clutch-coil F is now sufficiently strong to drag armature $f$ around, thereby driving gear G, winding up the rope $h$, and raising the switch member $b^1$. This gradually cuts out the resistance from the secondary circuit of the motor, until the motor current rises sufficiently to cause magnet J to pull down its armature, causing magnet K to break the short-circuit around resistance N. Switch member $b^1$ consequently begins to move down, cutting in resistance again, until the primary current again falls slightly below normal. Switch member $b^1$ thus moves up and down maintaining a normal input to the motor. Whenever the load on the motor increases above normal, magnet J will be actuated so as to remove the short-circuit from magnet K, which breaks the resistance short-circuit. This allows switch member $b^1$ to drop, cutting resistance into the secondary circuit of motor A, increasing its slip and allowing the fly-wheel to give up a portion of its stored energy. As soon as the abnormal load ceases, resistance B will again be cut out in the manner above described.

Although I have utilized the shaft of motor A, itself, as the source of mechanical power for operating the switch member $b^1$, it will be understood that any other suitable source of power may be employed. Furthermore, I do not desire to limit myself to the particular construction and arrangement of parts here shown, but aim in the appended claims to cover all modifications which are within the scope of my invention.

What I claim as new and desire to secure by Letters Patent of the United States, is:

1. In combination with an electric motor, an impedance in circuit therewith, a switch member for varying the amount of said impedance, operative connections from said switch member to a source of mechanical power, a slipping clutch in said connections, said switch member exerting a constant torque on one of the members of said clutch, and means controlled by the motor current for varying the torque between the clutch members.

2. In combination with an electric motor, an impedance in circuit therewith, a switch member for varying the current of said impedance, operative connections from said switch member to a source of mechanical power, a slipping magnetic clutch in said connections, said switch member exerting a constant torque on the armature of said clutch, and means controlled by the motor current controlling the current supplied the clutch winding.

3. In combination with an electric motor, a fly-wheel mechanically-connected thereto, an impedance in circuit therewith, a switch member for varying the amount of said impedance, operative connections from said switch member to a source of mechanical power, a slipping clutch in said connections, said switch member exerting a constant torque on one of the members of said clutch, and means controlled by the motor current for varying the torque between the clutch members.

4. In combination with an electric motor, a fly-wheel mechanically-connected thereto, an impedance in circuit therewith, a switch member for varying the amount of said impedance, operative connections from said switch member to a source of mechanical power, a slipping magnetic clutch in said connections, said switch member exerting a constant torque on the armature of said clutch, and means controlled by the motor current controlling the current supplied the clutch winding.

5. In combination with an induction motor, a resistance in the secondary circuit of the motor, a switch member for varying the amount of said resistance, operative connections from said switch member to a source of mechanical power, a clutch of the eddy current type in said connections, said switch member exerting a constant torque on the armature of said clutch, and means controlled by the primary current in said motor controlling the current supplied the clutch winding.

6. In combination with an induction motor, a fly-wheel mechanically-connected thereto, a resistance in the secondary circuit of the motor, a switch member for varying the amount of said resistance, operative connections from said switch member to a source of mechanical power, a slipping clutch of the eddy current type in said connections, said switch member exerting a constant torque on one of the members of said clutch, and means controlled by the primary current in said motor controlling the current supplied the clutch winding.

In witness whereof, I have hereunto set my hand this 25th day of July, 1906.

HAROLD H. CLARK.

Witnesses:
BENJAMIN B. HULL,
GRACE M. HANIGAN.